(12) United States Patent
Fox et al.

(10) Patent No.: US 6,502,272 B1
(45) Date of Patent: Jan. 7, 2003

(54) REPLACEABLE HEAD TOOTHBRUSH PROVIDING CONTROLLED BRUSHING PRESSURE

(75) Inventors: Rich Fox, Portland, OR (US); Jan Hippen, Portland, OR (US); Dave Knaub, Portland, OR (US); Ildefonso Resuello, Portland, OR (US); Phil Frank, Portland, OR (US); Robert Moskovich, East Brunswick, NJ (US)

(73) Assignee: Colgate-Palmolive Company, New York, NY (US)

( * ) Notice: Subject to any disclaimer, the term of this patent is extended or adjusted under 35 U.S.C. 154(b) by 0 days.

(21) Appl. No.: 09/577,437

(22) Filed: May 24, 2000

(51) Int. Cl.[7] .............................. A46B 7/04; A46B 9/04
(52) U.S. Cl. ...................... 15/167.1; 15/172; 15/176.1
(58) Field of Search ................................ 15/167.1, 172, 15/176.1

(56) References Cited

U.S. PATENT DOCUMENTS

| 2,196,284 A | * | 4/1940 | Ackerman | 15/167.1 X |
| 4,575,894 A | * | 3/1986 | Stevens et al. | 15/172 |
| 6,134,738 A | * | 10/2000 | Weber et al. | 15/172 X |

FOREIGN PATENT DOCUMENTS

| FR | 2550068 | * | 2/1985 | 15/167.1 |
| WO | 99/16332 | * | 4/1999 | |

* cited by examiner

*Primary Examiner*—Mark Spisich
(74) *Attorney, Agent, or Firm*—Henry S. Goldfine

(57) ABSTRACT

The present invention relates to replaceable head toothbrushes and method of use thereof, which toothbrushes have a handle section ending in an elastomeric coupler which is interference fit within an annular collar at the end of the handle section; which elastomeric coupler, depending upon the durometer of the elastomer chosen, provides more or less attenuation of the user's brushing force.

9 Claims, 2 Drawing Sheets

REPLACEABLE HEAD TOOTHBRUSH PROVIDING CONTROLLED BRUSHING PRESSURE

FIELD OF THE INVENTION

The present invention relates to replaceable head toothbrushes and method of use thereof, and more particularly, to replaceable head toothbrushes wherein the replaceable head section is joined to a handle section by a flanged elastomeric coupler at the end of the head which is interference fit within a corresponding annular collar at the end of the handle section; which elastomeric coupler, depending upon the durometer of the elastomer chosen, provides more or less attenuation of the brushing force applied to the handle by the user.

BACKGROUND OF THE INVENTION

Replacement head toothbrushes, such as those disclosed in U.S. pat. Nos. 632,524, 1,131,863, and 5,224,234, are known in the art to provide cost effective means of replacing worn bristles. Such toothbrushes further facilitate the frequent, recommended replacement of brushes in situations such as after surgery or while the user is undergoing chemotherapy, to avoid accumulation of germs and bacteria. However, the bayonet type head replacement mechanisms disclosed is these patents, which rigidly lock the replacement head to the handle, does not address the problem that excessive brushing pressure may cause harm to the soft oral tissues within the mouth, especially the gingiva.

U.S. pat. No. 5,903,949 and PCT published patent applications WO 98/37788, 99/16332 and 99/39610 disclose toothbrushes having a flexible linkage between the head and the handle to help protect the soft oral tissues from excessive brushing pressure. The flexible linkage in U.S. Pat. No. 5,903,949, WO 98/37788 and WO 99/39610 involves thinning of the relatively rigid material of construction of the toothbrush, the thinned portion being filled in with a resiliently flexible material. Alternatively, the flexible linkage as in WO 99/16332 involves a mechanical hinge connecting the head and handle, the hinge contains a torsion element which restricts the relative rotation of the head and handle and which tends to return the toothbrush to its original configuration. The use within these particular toothbrushes of a particular resiliently flexible material with a fixed durometer, or alternatively a particular torsion element with a fixed spring coefficient, limits the design to either an average brushing force or to an assumed, i.e. arbitrary, level of excessive brushing force.

Thus there is a clear need for a toothbrush having a replaceable head, that also provides a means to attenuate the particular users brushing pressure to avoid harm to the soft oral tissues of the mouth.

BRIEF SUMMARY OF THE INVENTION

The present invention encompasses a toothbrush and method of use thereof, wherein the toothbrush has a head section and a handle section, the head section having a first end with bristles extending from a surface thereof, and a second end with an elastomeric coupler extending at an obtuse angle therefrom; the elastomeric coupler having a tapered body with flanges extending on its upper and lower surfaces; the elastomeric coupler being configured to removably interference fit within an annular collar located at the end of the handle section; the annular collar being configured such that the flanges extending over the top and bottom thereof to hold the elastomeric coupler in place; wherein, during brushing the elastomeric coupler will absorb at least part of the force applied by the user to the handle section, so as to attenuate the brushing force against the soft oral tissues of the mouth.

The method of use of toothbrushes of the present invention to control brushing pressure by the user, involves providing to the user a plurality of alternative head sections, each head section with an elastomeric coupler having a distinctly different Shore A hardness or durometer in the range of about 0 to about 80. The user then selects the alternative head section, having an elastomeric coupler of the desired hardness to properly attenuate that users particular brushing force.

DETAILED DESCRIPTION OF THE INVENTION

Figure 1:
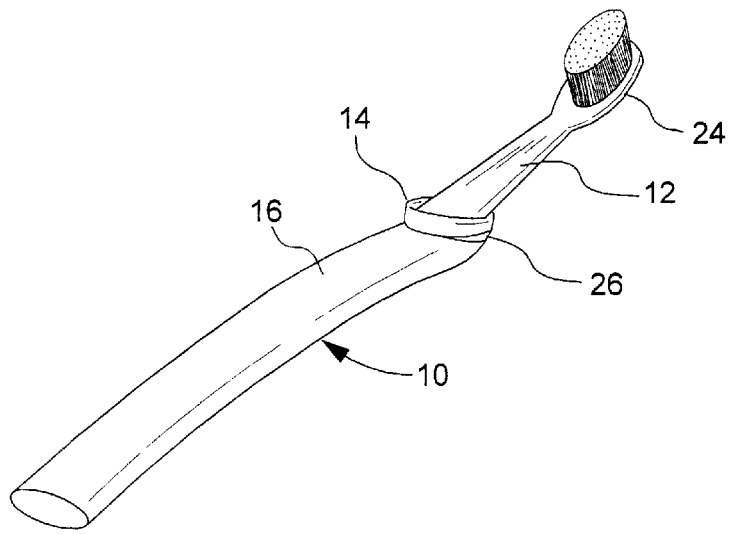
FIG. 1 is a top perspective view of an embodiment of the toothbrush of the present invention from the handle end.

Referring to the drawings, wherein like reference numerals refer to the same or similar elements among the several figures, and in particular to FIG. 1; wherein there is shown a toothbrush, 10, in accordance with the present invention. The toothbrush, 10, contains a head section 12 having a bristle bearing head 24 at one end and an elastomeric coupler 14 at the other. The toothbrush, 10, also contains a handle section 16 which is joined to the head section 12 by the elastomeric coupler 14 being removably interference fit within an annular collar 26 at a first end of the handle section 16.

Figure 2:
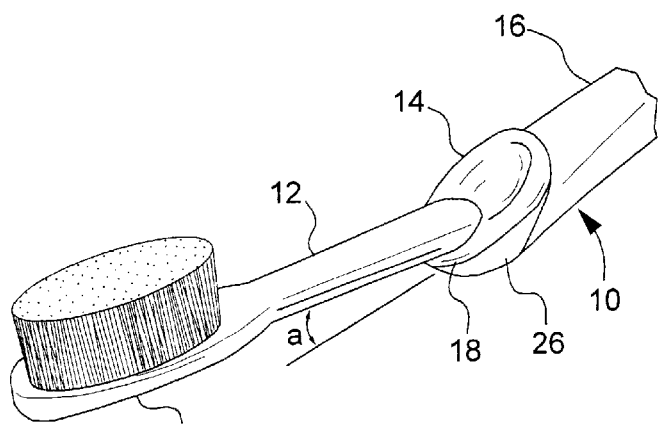
FIG. 2 is a head-on perspective view of the toothbrush of FIG. 1, showing an enlargement of the front section of the toothbrush.
Figure 4:
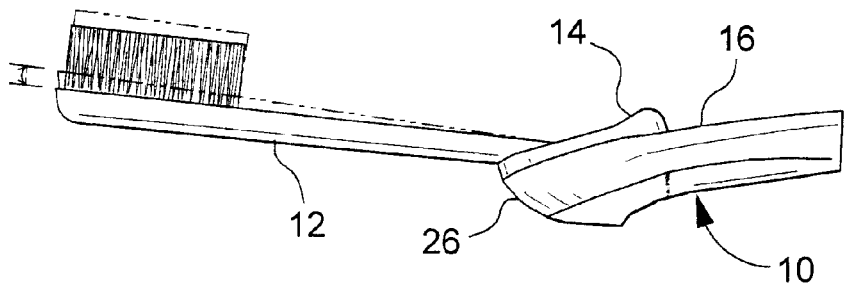
FIG. 4 is a right side view of a second embodiment of the toothbrush of the present invention, showing the flex of the elastomeric coupler at the end of the head section, which coupler is seated within the annular collar at the end of the handle, joining the head to the handle sections. The degree of movement is shown by the vertical line with arrow heads at each end, which in this case is relatively small due to the coupler being of a relatively high durometer elastomer.
Figure 5:
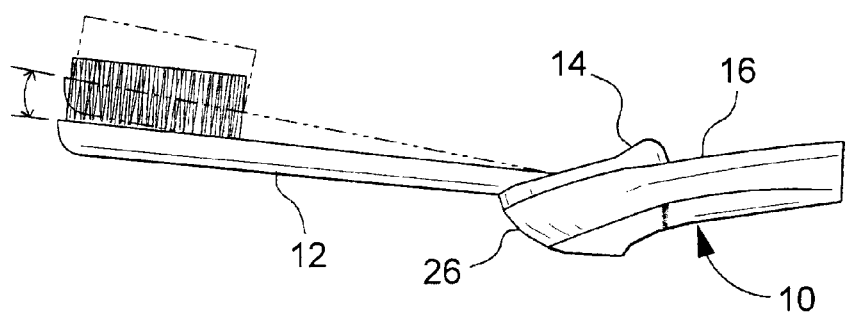
FIG. 5 is a right side view of a third embodiment of the toothbrush of the present invention, showing the flex of the elastomeric coupler at the end of the head section, which coupler is seated within the annular collar at the end of the handle, joining the head to the handle sections. The degree of movement is shown by the vertical line with arrow heads at each end, which in this case is greater than that of the second embodiment shown in FIG. 4; due to the coupler being of a lower durometer.
Figure 6:
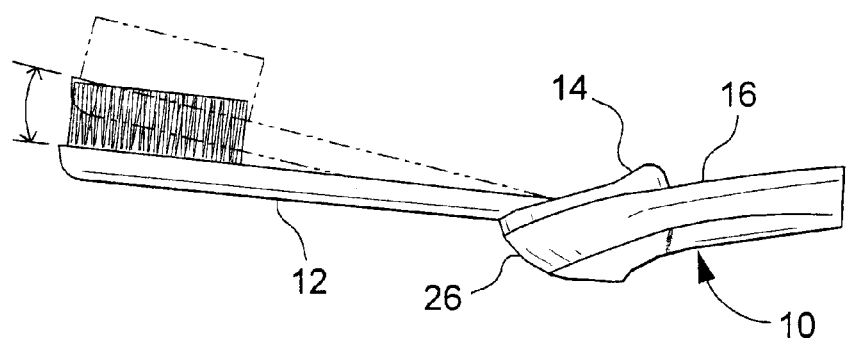
FIG. 6 is a right side view of a fourth embodiment of the toothbrush of the present invention, showing the flex of the elastomeric coupler at the end of the head section, which coupler is seated within the annular collar at the end of the handle, joining the head to the handle sections. The degree of movement is shown by the vertical line with arrow heads at each end, which in this case is greater still than that of the third embodiment shown in FIG. 5, due to the coupler being of a still lower durometer.

As stated above, the elastomeric coupler 14 extends at an obtuse angle from the end of the head section 12. This obtuse angle can be more clearly defined by looking at its complementary acute angle, "a" as shown in FIG. 2, an enlarged perspective view of the head and front portion of the handle section of a toothbrush 10 of the present invention. Angle "a" can be measured from an imaginary horizontal plane along flat bottom surface of the upper flange 18 of the elastomeric coupler 14, i.e. the same plane as across the flat upper surface 30 of the annular collar 26. Angle "a" can be within the range of from about 5 to about 45 degrees, such that the complementary obtuse angle at which the elastomeric coupler 14 extends from the end of the head section is from about 175 to about 135 degrees. Preferably, angle "a" is in the range of from about 8 to about 20 degrees, corresponding to the elastomeric coupler 14 extending at an obtuse angle of from about 172 to about 160 degrees with respect to the head section 12. The head section 12 is embedded within the elastomeric coupler 14 at such an acute angle with respect to the annular collar 26 to allow the head section 12 to move within the elastomeric material of the coupler without interference from the rigid upper surface 30 of the annular collar 26. Such movement of the head section 12 is illustrated in FIGS. 4, 5, and 6.

Figure 3:
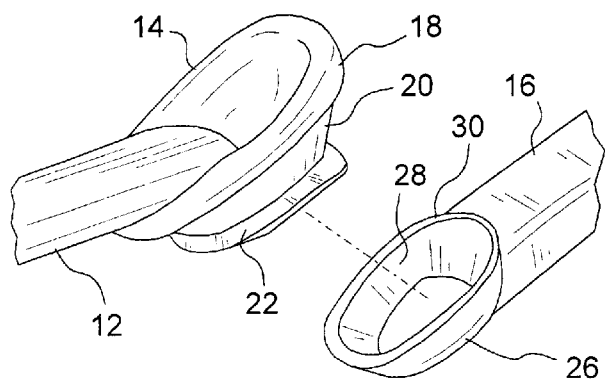
FIG. 3 is a further enlargement of the elastomeric coupler at the end of the head section and the annular collar at the end of the handle section of the toothbrush shown in FIG. 2.

Referring now to FIG. 3, wherein a further enlargement of the elastomeric coupler 14 and annular collar 26 of the present invention are shown. It can be seen that the tapered body 20 of the elastomeric coupler 14 is configured to intimately fit within the annular interior surface 28 of the annular collar 26. As indicated by the arrow shown in FIG. 3, the elastomeric coupler 14 is interference fit within the annular collar 26, by the lower flange 22 of the elastomeric coupler 14 being compressed against the relatively rigid material of construction of the annular collar 26. Once the elastomeic coupler 14 is in-place within the annular collar 26, the lower flange 22 will uncompress and cooperate with the upper flange 18 to maintain the elastomeric coupler 14 snuggly within the annular collar 26, such that the head section 12 will not separate from the handle section 16 under typical brushing forces.

Referring to FIGS. 1, 2, and 3, as shown the end of the handle section 16 near the annular collar 26 is curved or angled with respect to an imaginary horizontal plane (not shown) along the longitudinal axis of the handle section 16, such that the annular collar 26 will present itself at an angle to the elastomeric coupler 14, for ease of insertion when the elastomeric coupler 14 is being inserted therein. The angle at which the annular collar 26 is oriented with respect to the horizontal plane can be from about 0 to 20 degrees below the horizontal plane.

The elastomeric coupler 14 can be molded of a thermoplastic elastomer of combination thereof, including a thermoplastic vulcanate (TPV) which consists of a mixture of polypropylene and ethylene propylene diene monomers (EPDM), which is available as Santoprene (brand), described in U.S. Pat. No. 5,393,796; or Vyram (brand), another TPV consisting of a mixture of polypropylene and natural rubber, both Santoprene and Vryam being elastomers marketed by Advanced Elastomeric Systems LP, Akron, Ohio 44311. Another, and preferred elastomer is Dynaflex G6713 (brand), a thermoplastic elastomer marketed by GLS Corp., Cary, Ill. 60013. These and other suitable elastomers have, typically, a Shore A hardness within the range from about 0 to 80. A plurality of such head sections 12 can be made available to the consumer having a variety of elastomeric couplers 14 each with a discrete Shore A hardness, such as 0, 10, 20, 30, 40, 50, 60, 70 and 80; to allow the consumer to choose a particular hardness to provide the desired attenuation of that consumers particular brushing pressure. This attenuation of the consumers brushing force is proportional to the yield or flex by within the particular elastomeric coupler 14 used. FIG. 6 illustrates a very soft, yielding elastomeric coupler 14, which may have a Shore A hardness in the range of 0 to 10 and which will greatly attenuate the users brushing force. FIG. 5 illustrates a less yielding elastomeric coupler 14, which will provide less attenuation than that shown in FIG. 6 and which may have a Shore A hardness in the range of 30 to 50. Finally, FIG. 4 illustrates a still less yielding elastomeric coupler 14, than that shown in either FIG. 5 or 6, having a Shore A hardness of from about 60 to 80 and which will attenuate little of the users brushing force.

The head section 12 and handle section 16 are preferably molded of a relatively rigid plastic, such as polypropylene, or if a clear appearance is desired of a polyester, such as polyethylene terephthalate. A suitable polypropylene, with a flexural modulus of 216,000 psi (15,186 kilograms/cm$^2$) by ASTM test method D790, is available from Huntsman Corporation, Longview, Tex. 75603 under the trade-designation Huntsman Polypropylene P4G3Z-039. Another suitable polypropylene is available from Amoco Polymers, Inc., Alpharetta, Ga. 30202-3914, sold under the trade designation 7635 with a flexural modulus of about 275,000 psi (19,334 kilograms/cm$^2$). Use of a toothbrush handle of such a 216,000 psi (15,186 kilograms/cm$^2$) to 275,000 psi (19,334 kilograms/cm$^2$) material will provide enhanced rigidity to allow the user to better control and manipulate the position of the toothbrush head during brushing.

Conventional one component injection molds useful in the manufacture of the present invention are available from Machines Boucherie, Nev., Izegem, Belgium. Which molds can be mounted in typical injection molding machines, such as 300 ton injection molding machines available from Engel Canada, Inc., Guelph, Ontario.

We claim:

1. A replaceable head toothbrush comprising:
   a head section and a handle section, the head section having bristles extending from one end thereof and an elastomeric coupler extending at an obtuse angle from the other end thereof;
   the elastomeric coupler being configured to removably interference fit within an annular collar located at the end of the handle section;
   the elastomeric coupler having a Shore A hardness in the range of about 0 to about 80; wherein, during brushing the elastomeric coupler will absorb at least part of the force applied by the user to the handle section to attenuate the brushing force against the soft oral tissues of the mouth.

2. The toothbrush of claim 1, wherein the elastomeric coupler has flanges extending out from the top and bottom surfaces thereof and the annular collar is configured such that when the elastomeric coupler is joined to the annular collar, the flanges will be in intimate contact with the annular collar, extending over the top and bottom surfaces thereof, to securely maintain the elastomeric coupler snuggly within the annular collar, such that the head section will not separate from the handle section under typical brushing forces.

3. The toothbrush of claim 1, wherein the obtuse angle at which the elastomeric coupler extends from the end of the head section is from about 175 to about 135 degrees.

4. The toothbrush of claim 1, wherein the annular collar is oriented at an angle with respect to an imaginary horizontal plane along the longitudinal axis of the handle section.

5. The toothbrush of claim 4, wherein the angle at which the annular collar is oriented with respect to the horizontal plane is from about 0 to 20 degrees below the horizontal plane.

6. The toothbrush of claim 1, wherein the elastomeric coupler is molded of a thermoplastic elastomer or combination thereof.

7. The toothbrush of claim 6, wherein the thermoplastic elastomer is selected from the group consisting of EPDM and a mixture of polypropylene and natural rubber.

8. A method of controlling toothbrushing pressure comprising:

provnding a plurality of alternative head sections and a handle section, each head section having bristles extending from one end thereof and an elastomeric coupler extending at an obtuse angle from the other end thereof;

each elastomeric coupler being configured to removably interference fit within an annular collar located at the end of the handle section;

elastomeric coupler having a discrete Shore A hardness in the range of about 0 to about 80;

selecting a particular head section having an elastomeric coupler of the particular Shore A hardness to provide the user with the proper attenuation of that user's particular brushing force to protect the soft oral tissues of that particular users mouth.

9. The method of claim 8, wherein the elastomeric couplers of the alternative head sections have a Shore A hardness selected from the group consisting of 0, 10, 20, 30, 40, 50, 60, 70 and 80.

* * * * *